United States Patent [19]
Takeuchi et al.

[11] Patent Number: 5,428,493
[45] Date of Patent: Jun. 27, 1995

[54] MOTOR STARTING RELAY DEVICE HAVING PTC THERMISTORS

[75] Inventors: Michikazu Takeuchi; Hiroshi Nohara, both of Tokyo, Japan

[73] Assignee: TDK Corporation, Tokyo, Japan

[21] Appl. No.: 130,463

[22] Filed: Oct. 1, 1993

[30] Foreign Application Priority Data

Oct. 2, 1992 [JP] Japan .................. 4-289315

[51] Int. Cl.⁶ ............................................. H02H 7/00
[52] U.S. Cl. ............................ 361/27; 361/29; 318/784
[58] Field of Search .................. 361/24–29, 361/31, 32, 103, 105, 106; 338/22 R; 318/783–785, 788–792

[56] References Cited

U.S. PATENT DOCUMENTS

| | | | |
|---|---|---|---|
| Re. 31,367 | 8/1983 | D'Entremont | 361/27 |
| 4,445,079 | 4/1984 | DeFilippis et al. | |
| 4,683,515 | 7/1987 | Beihoff et al. | 361/106 |
| 4,901,186 | 2/1990 | Tennant et al. | 361/106 |

FOREIGN PATENT DOCUMENTS

| | | |
|---|---|---|
| 0223599 | 5/1987 | European Pat. Off. . |
| 52-28113 | 6/1977 | Japan . |
| 56-38276 | 4/1981 | Japan . |
| 56-27185 | 6/1981 | Japan . |
| 58-34722 | 8/1983 | Japan . |
| 60-35971 | 2/1985 | Japan . |
| 61-32916 | 7/1986 | Japan . |
| 63-18817 | 4/1988 | Japan . |
| 2-2802 | 1/1990 | Japan . |
| 1042126 | 9/1966 | United Kingdom . |

OTHER PUBLICATIONS

K. Takasawa, pp. 777–781, "Application of PTC Thermistor to starter for air-conditioner compressor" no month 1875.

Primary Examiner—Brian K. Young
Assistant Examiner—Ronald W. Leja
Attorney, Agent, or Firm—Oblon, Spivak, McClelland, Maier & Neustadt

[57] ABSTRACT

In a relay device, a first PTC thermistor has one end connected to a first external connecting terminal, and the other end connected to one end of a second PTC thermistor, the other end of which is connected to a second external connecting terminal, and the thermo-switch is thermally coupled to the first and second PTC thermistors, and connected in parallel with the second PTC thermistor. The thermo-switch is held closed when not heated, and is opened by heat generated by the first or second PTC thermistor. Therefore, the relay device is low in initial resistance, and small in power consumption during heat balance.

12 Claims, 6 Drawing Sheets

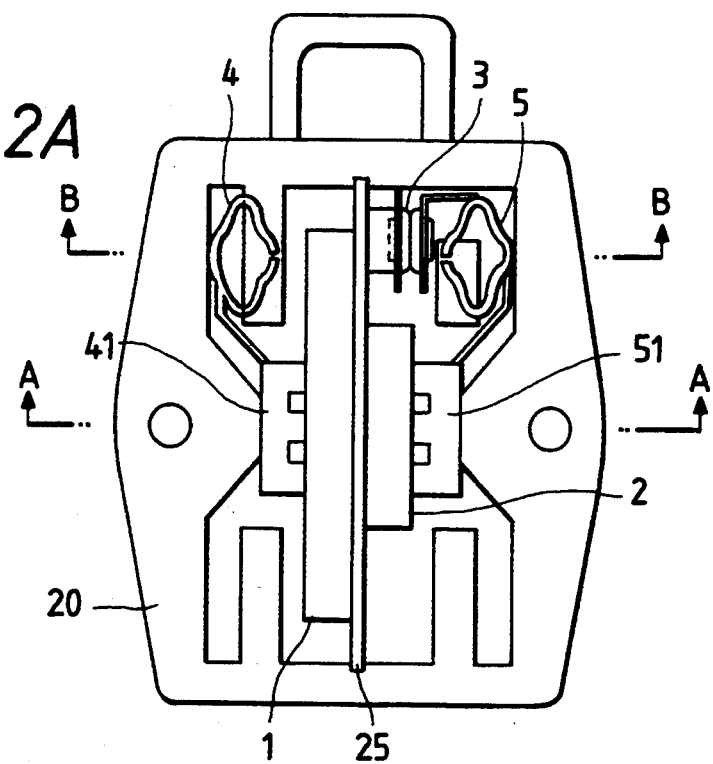
FIG. 2A
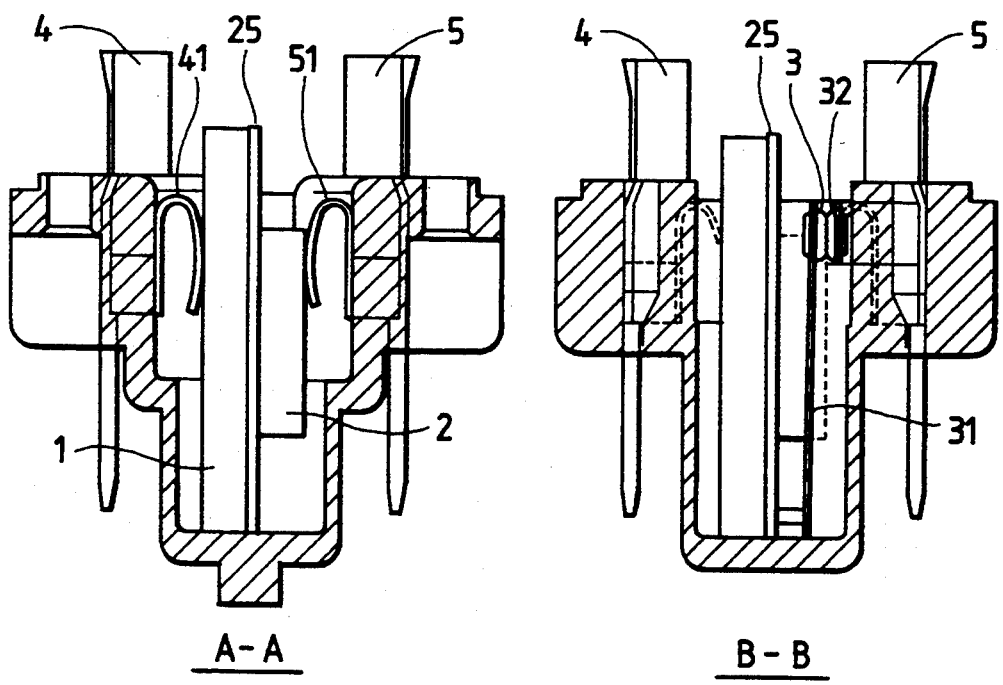
FIG. 2B
FIG. 2C
A-A
B-B

MOTOR STARTING RELAY DEVICE HAVING PTC THERMISTORS

BACKGROUND OF THE INVENTION

1. Field of the Invention

This invention relates to relay devices, and more particularly to a motor starting relay device utilizing a positive temperature characteristics of positive temperature coefficient (PTC) resistance elements such as positive characteristic thermistors.

2. Discussion of the Prior Art

A relay device operating on the resistance temperature characteristic of a positive characteristic (PTC) thermistor has been extensively employed for starting an electric motor such as a compressor motor for a refrigerator or an air conditioner. The motor-starting relay device is provided for operating the starter circuit of an electric motor of capacitor start type or split-phase start type; that is, it operates as a kind of off-delay relay.

As disclosed by Post-examined Japanese Utility Model Publication (Kokoku) Sho-58-34722/(1983), Post-examined Japanese Patent Publication (Kokoku) Sho-63-18817/(1988), and Unexamined Japanese Model Application (Kokai) Hei-2-2802/(1990), a conventional motor-starting relay device uses one PTC thermistor.

A conventional split-phase start type single-phase motor is shown in FIG. 10, in which the PTC thermistor 101 is connected to the auxiliary winding 104 of the motor 102. For an initial period of time immediately after the power switch 106 is turned on to start the motor, the temperature of the PTC thermistor 101 is low, thus operating as a low-resistance element of several tens of ohms ($\Omega$). Since the impedance of the auxiliary winding circuit which is determined from the low resistance of the PTC thermistor and the inductance of the auxiliary winding 104 is different from the impedance of the main winding circuit which is determined from the inductance of the main winding 103, the current I2 in the auxiliary winding 104 is shifted in phase to the current I1 in the main winding 103 of the motor 102. This phase difference gives rise to a rotating magnetic field, as a result of which the armature of the motor starts rotation. After the motor has been started, the PTC thermistor 101 generates heat by itself with the lapse of time; that is, its temperature is increased, and accordingly its resistance is greatly increased (to several tens of kilo-ohms (k$\Omega$) to several hundreds of kilo-ohms (k$\Omega$)) so that the current I2 flowing in the auxiliary winding 103 is greatly decreased to a micro current (several mili-ampere (mA)) only. Thus, the motor 102 is allowed to rotate in steady state. As is apparent from the above description, the PTC thermistor 101 operates as a starting resistor low in resistance, and as a high resistance element which to decrease the current I2 flowing in the auxiliary winding 104 is greatly decreased into slight current. That is, the PCT functions as a relay device which substantially electrically disconnects the auxiliary winding.

As was described above, in the conventional PTC relay device, the PTC thermistor is used as a high resistance element to substantially electrically disconnects the auxiliary winding. Therefore, during the steady operation of the motor, it is essential for the PTC thermistor to generate heat thereby to be maintained high in resistance. As a result, the PTC thermistor may consume electric power up to 3 to 4 watts.

On the other hand, it is necessary for the PTC thermistor to show high resistance for the relaying operation, and to meet the requirement that it should operates as a starting resistor low in resistance. Hence, in the prior art using only one PTC thermistor, the resistance temperature characteristic required for the PTC thermistor is determined, and therefore it is difficult to reduce the power consumption of the relay device.

SUMMARY OF THE INVENTION

Accordingly, an object of this invention is to eliminate the above-described difficulties accompanying a conventional motor starting relay device. More specifically, an object of the invention is to provide a motor starting relay device in which the initial resistance is maintained low, and the power consumption is greatly reduced during heat balance.

The foregoing object of the invention has been achieved by the provision of a relay device comprising at least two positive characteristic (PTC) thermistors, namely, first and second PTC thermistors, and a thermo-switch (heat-operated switch), in which, according to the invention, the first PTC thermistor has one end connected to a first external connecting terminal, and the other end connected to one end of the second PTC thermistor, the other end of which is connected to a second external connecting terminal, the thermo-switch is thermally coupled to the first and second PTC thermistors, and connected in parallel with the second PTC thermistor, the thermo-switch being held closed when not heated, and being opened by heat generated by the first or second PTC thermistor.

In the relay device of the invention, as was described above, one end of the first PTC thermistor is connected to the first external connecting terminal, and the other end to one end of the second PTC thermistor, the other end of which is connected to the second external connecting terminal, and the thermo switch is connected in parallel to the second PTC thermistor and is held closed when not heated. Hence, when voltage is applied between the external connecting terminals, for an initial period of time immediately after the application of the voltage, the second PTC thermistor is short-circuited by the thermo-switch is held closed, and therefore the voltage is applied, in its entirety, to the first PTC thermistor, so that the latter generates heat. In this case, the initial resistance of the relay device is determined by the first PTC thermistor, and therefore the initial resistance can be set to a low value by employing a PTC thermistor low in cold resistance as the first PTC thermistor.

The thermo-switch is thermally coupled to the first PTC thermistor, so that it is opened in response to heat generated by the first PTC thermistor. Hence, when the temperature of the heat generated by the first PTC thermistor reaches the operation temperature of the thermo-switch, the latter is opened by the heat generated by the first PTC thermistor.

The thermo-switch is also connected to the second PTC thermistor. Therefore, when the thermo-switch is opened in the above-described manner, the first and second PTC thermistors form a series circuit, so that the voltage applied between the first and second external connecting terminals is applied across the series circuit of the first and second PTC thermistors, and accordingly the second PTC thermistor also generates heat.

As a result, the thermo-switch, being thermally coupled to the second PTC, is opened by the heat generated by the second PTC thermistor. Therefore, the thermo-switch which has been opened by the heat generated by the first PTC thermistor, is maintained opened mainly by the heat generated by the second PTC thermistor.

In this operation, the power consumption of the circuit is the sum of the power consumptions of the first and second PTC thermistors. Hence, the power consumption of the circuit can be decreased by designing it in such a manner that the total power consumption during heat balance is smaller than the power consumption of the circuit when only the first PTC thermistor is active. Therefore, the initial resistance which is provided for an initial period of time immediately after the power switch is turned on can be set to a small value, and the power consumption during heat balance can be greatly reduced. By suitably adjusting the electrical and thermal relations between the first and second PTC thermistors so that those thermistors share the circuit voltage suitably, the generation of heat by the second PTC thermistor can be started and advanced. In general, when the thermo-switch is opened, the resistance of the first PTC thermistor has reached a high value. Hence, in order that the second PTC thermistor shares the voltage with the first PTC thermistor to switch the supply of heat to the thermo-switch, it is desirable that the second PTC thermistor is small in size and high in resistance. For this purpose, it is effective to employ a method in which the second PTC thermistor is preheated by the first PTC thermistor.

The nature, utility and principle of the invention will be more clearly understood from the following detailed description and the appended claims when read in conjunction with the accompanying drawings.

BRIEF DESCRIPTION OF THE DRAWINGS

In the accompanying drawings:

FIGS. 2A, 2B and 2C are structural views of a relay device of the invention;

DETAILED DESCRIPTION OF THE PREFERRED EMBODIMENTS

Figure 1A:
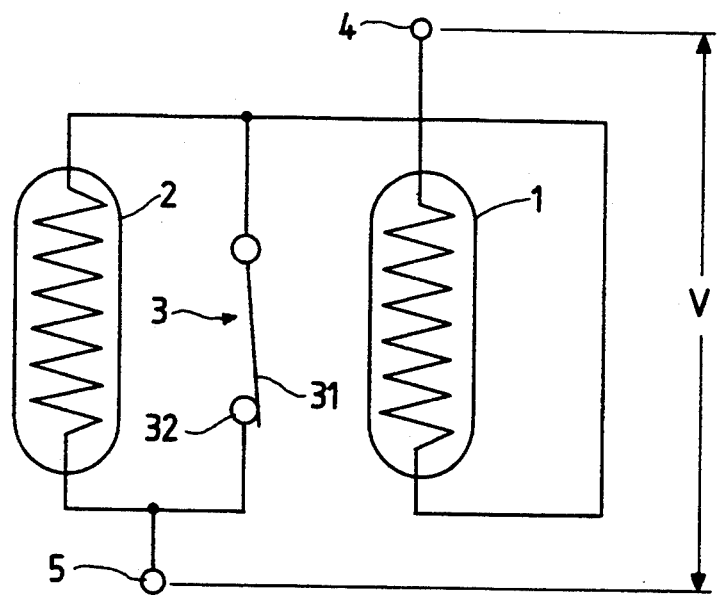
FIG. 1A is a circuit diagram showing a motor starting relay device according to this invention.
Figure 1B:
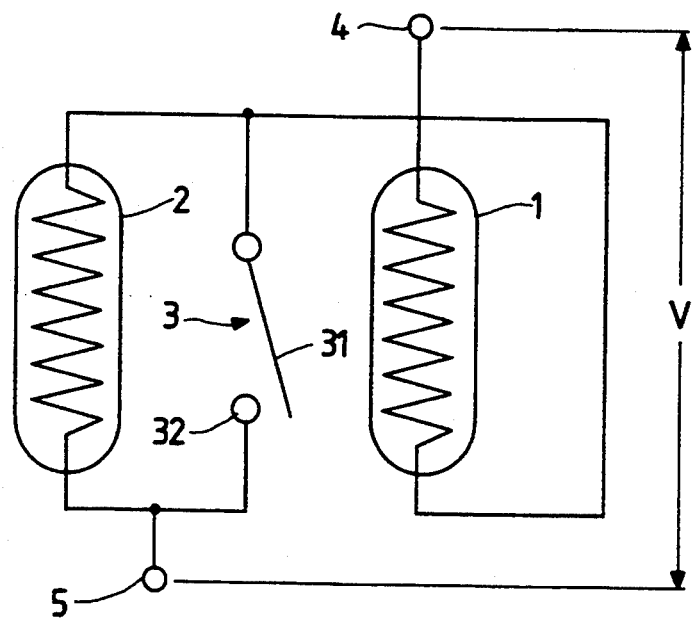
FIG. 1B is a circuit diagram for a description of the operation of the relay device.

A relay device according to this invention has an electrical circuit as shown in FIGS. 1A and 1B.

The circuit comprises: first and second positive characteristic (PTC) thermistors 1 and 2; and a thermo-switch (heat-operated switch) 3. The circuit should have at least two PTC thermistors. One terminal of the first PTC thermistor 1 is connected to an external connecting terminal 4, and the other terminal is connected to one terminal of the second PTC thermistor 2. The other terminal of the second PTC thermistor 2 is connected to another external connecting terminal 5. That is, the first and second PTC thermistors 1 and 2 are connected in series to each other.

The thermo-switch 3 is thermally coupled to the first and second PTC thermistors 1 and 2, and connected in parallel to the second PTC thermistor 2. The thermo-switch 3 is held closed when not heated.

As was described above, the first and second PTC thermistors 1 and 2 are connected in series to each other, and the thermo-switch 3 is connected in parallel to the second PTC thermistor 2, and is held closed when not heated. When a voltage V is applied between the external connecting terminal 4 and 5, since the second PTC thermistor 2 is short-circuited by the thermo-switch 3 which is held closed, the voltage V is applied to the first PTC thermistor 1 as it is, so that the latter 1 generates heat. In this operation, the initial resistance of the relay device depends on a cold (room temperature) resistance value of the first PTC thermistor 1. Therefore, the initial resistance can be set to a low value by setting the cold resistance of the first PTC thermistor 1 to a low value.

The relay device of the invention is constructed as shown in FIGS. 2A, 2B and 2C.

That is, the first and second PTC thermistors 1 and 2 are built in a resin casing 20 in such a manner that they are confronted through a common electrode 25 with each other. The thermo-switch 3, as shown in FIG. 2C, is connected to the common electrode 25 at the lower end. The outer surfaces of the first and second PTC thermistors 1 and 2 confronted with each other, are held by contact spring terminals 41 and 51, respectively, which are integral with the external connecting terminals 4 and 5, respectively. The external connecting terminal 5 has a contact 32, which is brought into contact with the contact of the thermo-switch 3.

The thermo-switch 3 is thermally coupled to the first PTC thermistor 1 through the common electrode 25, and is opened in response to heat generated by the first PTC thermistor 1. More specifically, when the temperature of heat generated by the first PTC thermistor 1, increasing with time, reaches the operation temperature of the thermo-switch 3, the latter 3 is opened in response to the heat thus generated by the first PTC thermistor 1 as shown in FIG. 1B.

The thermo-switch 3 is connected in parallel to the second PTC thermistor 2. Hence, when the switch is opened in the above-described manner, the first and second PTC thermistors 1 and 2 forms a series circuit. As a result, the voltage V is applied across the series circuit of the first and second PTC thermistors 1 and 2, so that the second PTC thermistor 2 also generates heat. In this case, the power consumption of the circuit is the sum of the power consumption P1 of the first PTC thermistor 1 and that P2 of the second PTC thermistor 2. Hence, the total power consumption P during the heat balance can be decreased by designing the circuit to be small a current flowing therein. Consequently, the total power consumption P can be smaller than that P0 in the case where only the first PTC thermistor 1 is active.

The thermo-switch 3 is thermally coupled through the common electrode 25 to the second PTC thermistor 2, and therefore it is opened in response to heat generated by the latter 2. Therefore, the thermo-switch 3 which has been opened by the heat generated by the first PTC thermistor 1 is maintained opened by the heat generated by the second PTC thermistor.

Figure 3:
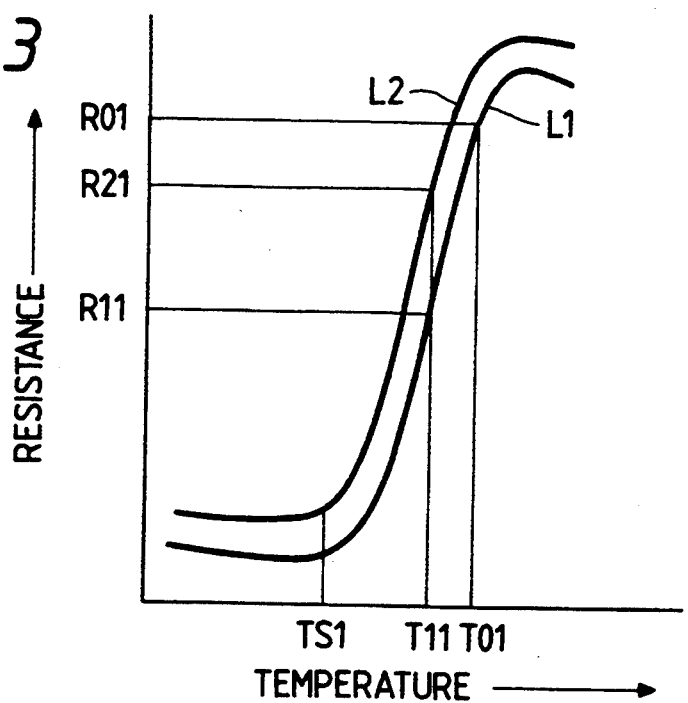
FIG. 3 is a graphical representation showing the resistance temperature characteristics of PTC thermistors which are suitable for the relay device of the invention.

FIG. 3 shows the resistance temperature characteristics of the first and second PTC thermistors 1 and 2. More specifically, in FIG. 3, the curves L1 and L2 indicate the resistance temperature characteristics of the first and second PTC thermistors 1 and 2, respectively.

The composite resistance (R11+R12) of the series circuit of the first and second PTC thermistors 1 and 2 during heat balance at a heat balance temperature T11 is made higher than the resistance R01 of the circuit during heat balance (at a heat balance temperature T01) when only the first PTC thermistor 1 is active, so that the circuit current is decreased, and accordingly the power consumption is reduced. The relay device comprises two PTC thermistors, namely, the first and second PTC thermistors 1 and 2. Therefore, the initial resistance is provided by the first PTC thermistor 1, and the composite resistance (R11 and R12) is set by selecting the characteristic of the PTC thermistor 2 with respect to that of the PTC thermistor. Hence, the initial resistance provided immediately after the power switch is turned on, can be set to a small value, and the power consumption during heat balance can be greatly reduced.

The resistance R21 of the second PTC thermistor 2 at a temperature T11 is higher than the resistance R11 of the first PTC thermistor 1 at the same temperature T11. Hence, when the thermo-switch 3 is opened, the voltage is applied to the second PTC thermistor 2 more than the first PTC thermistor 1, so that the generation of heat by the second PTC thermistor 2 is positively advanced.

Figure 4:
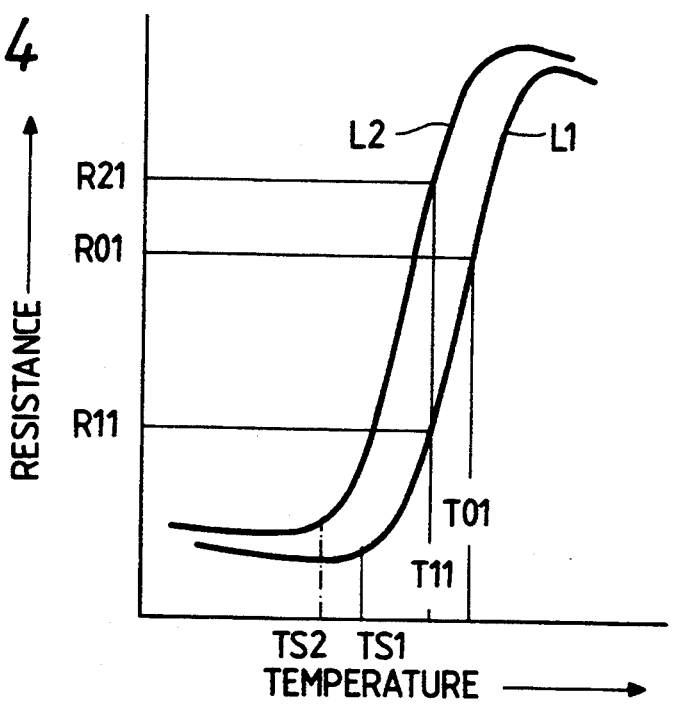
FIG. 4 is also a graphical representation showing the resistance temperature characteristics of other PTC thermistors which are also suitable for the relay device of the invention.

In the case of FIG. 3, the first and second PTC thermistors 1 and 2 are substantially equal in Curie point to each other; that is, their Curie points are substantially at TS1. On the other hand, as shown in FIG. 4, the Curie point TS2 of the second PTC thermistor 2 may be lower than the Curie point TS1 of the first PTC thermistor 1. In this case, when the thermo-switch 3 is opened by heat generated by the first PTC thermistor 1, the generation of heat by the second PTC thermistor 2 is positively advanced.

The first and second PTC thermistors 1 and 2 are confronted with each other through the common electrode 25. Therefore, the second PTC thermistor 2 is preheated by the first PTC thermistor 1, which makes it possible to switch the voltage sharing ratio of those thermistors when the thermo-switch 3 is opened.

It is desirable that the second PTC thermistor 2 is smaller in volume than the first PTC thermistor 1; that is, the former is smaller in thermal capacity than the latter, because when the thermo-switch 3 is opened, the generation of heat by the second PTC thermistor 2 is accelerated.

The use of the PTC thermistor small in thermal capacity is advantageous in the case where the motor has been stopped and should be restarted soon. The PTC thermistor is quickly cooled and becomes conductive again and the thermo-switch is closed, so that the motor can be started in a short time.

The thermo-switch 3 has a heat-operated piece 31 like an armature, which is provided on the side of the first PTC thermistor 1. This structure is advantageous in that heat generated by the first PTC thermistor 1 is quickly transmitted to the heat-operated piece 31 to accelerate the generation of heat by the second PTC thermistor 2. The thermo-switch 3 can be formed by using bimetal or shape memory alloy. The switch 3 is connected to directly or indirectly to the first and second PTC thermistors 1 and 2. When the switch 3 is opened, the current has been greatly reduced by the first PTC thermistor 1. Therefore, a material for forming the contact of the heat-operated piece 31, and the contact 32 is not so limitative.

Figure 5:
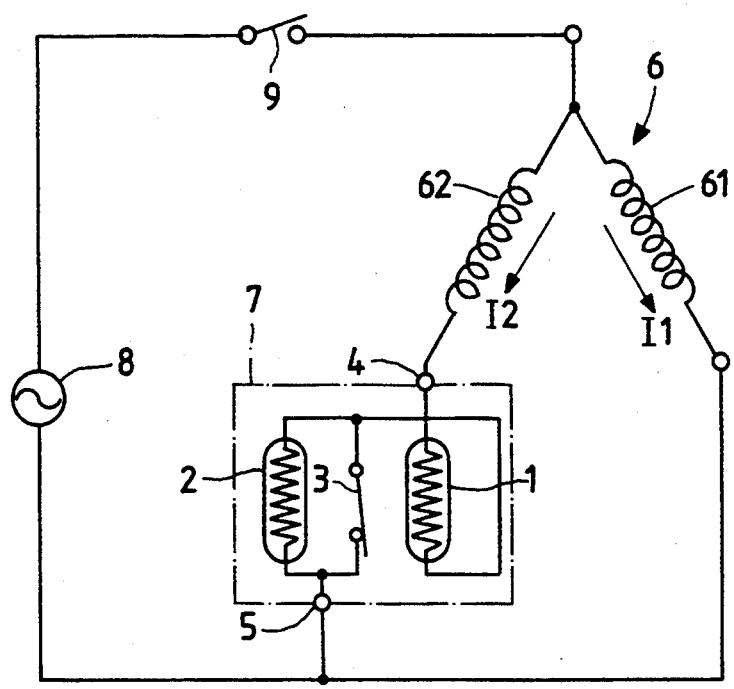
FIG. 5 is a circuit diagram showing a motor starting circuit with the relay device of the invention.

FIG. 5 shows a motor starting circuit with the relay device according to the invention. The circuit comprises: a single phase motor; a main winding 61; an auxiliary winding 62; the relay device 7 of the invention; a power source 8; and a power switch 9. The external connecting terminal 4 of the relay device 7 is connected to the auxiliary winding 62, and the external connecting terminal 5 to the power line.

Figure 6:
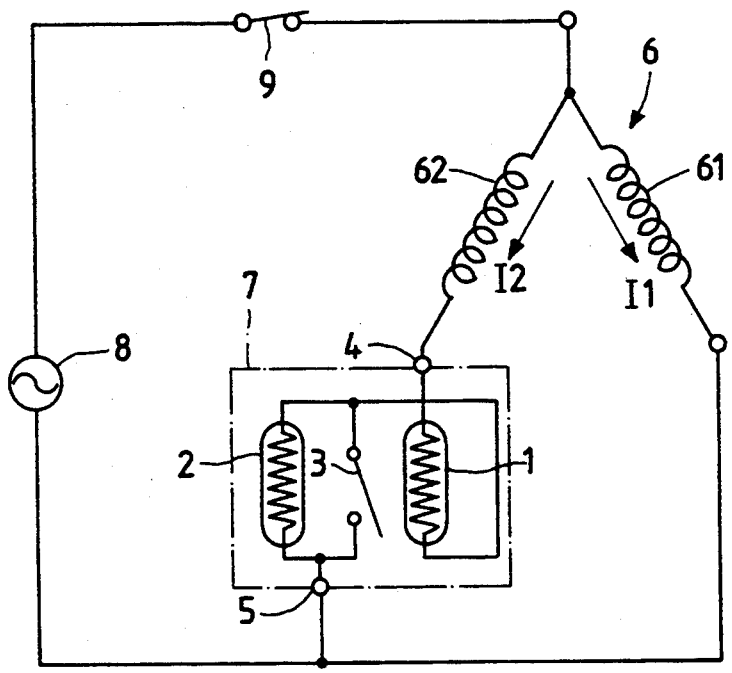
FIG. 6 is a circuit diagram for a description of the operation of the motor starting circuit.

Immediately after the power switch 9 is closed as shown in FIG. 6; that is, at the start time of the motor, the first PTC thermistor 1 operates as a low resistance element. The difference between the impedance of the circuit on the auxiliary winding side which is determined by the low resistance and the inductance of the auxiliary winding 62 and the impedance of the circuit on the main winding side which is determined by the inductance of the main winding 61, provides a phase difference between the current I2 flowing in the auxiliary winding 62 and the current I1 flowing in the main winding 61. This phase difference gives rise to a rotating magnetic field, so that the armature (not shown) of the motor starts rotation. When, after the start of the motor, the temperature generated by the first PTC thermistor 1 reaches the operating temperature of the thermo-switch 3, the latter 3 is opened by the heat generated by the first PTC thermistor 1 as shown in FIG. 6.

The thermo-switch 3 is connected in parallel with the second PTC thermistor 2. Therefore, when the switch 3 is opened in the above-described manner, the first and second PTC thermistors 1 and 2 form a series circuit, so that the voltage applied between the external connecting terminals 4 and 5 is applied across the series circuit of the first and second PTC thermistors 1 and 2, and the second PTC thermistor 2 also generates heat.

The thermo-switch 3, being thermally coupled to the second PTC thermistor 2, is opened by the heat generated by the second PTC thermistor 2. Hence, the thermo-switch 3 which has been opened by the heat generated by the first PTC thermistor 1, is maintained opened mainly by the heat generated by the second PTC thermistor 2. Thus, with the motor starting relay device of the invention, the power consumption during steady operation is reduced.

The motor starting relay device of the invention was formed by using PTC thermistors which are of the order of 3.3 $\Omega$ to 22 $\Omega$ in initial resistance and of the order of 14 mm to 20 mm in diameter. With the relay device thus formed, during steady operation the thermistor power consumption was 1.9 to 2.0 W, while being 3 to 4 W with the conventional relay device.

Furthermore, it should be noted that a power consumption can be further reduced if PCT thermistors used in the relay device have a steeper resistance-temperature characteristic than that shown in FIGS. 3 and 4.

Figure 7:
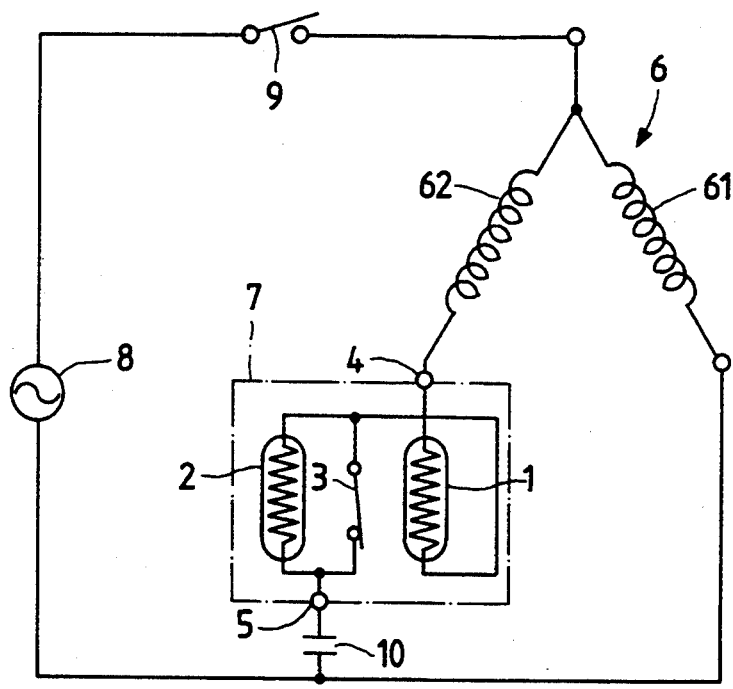
FIGS. 7, 8 and 9 are circuit diagrams showing other motor starting circuits with the relay device according to the invention.
Figure 8:
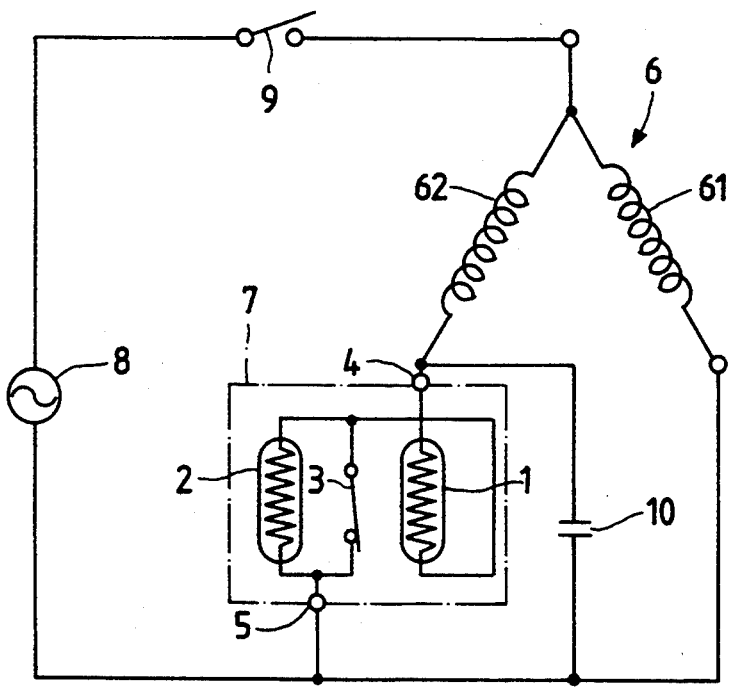
Figure 9:
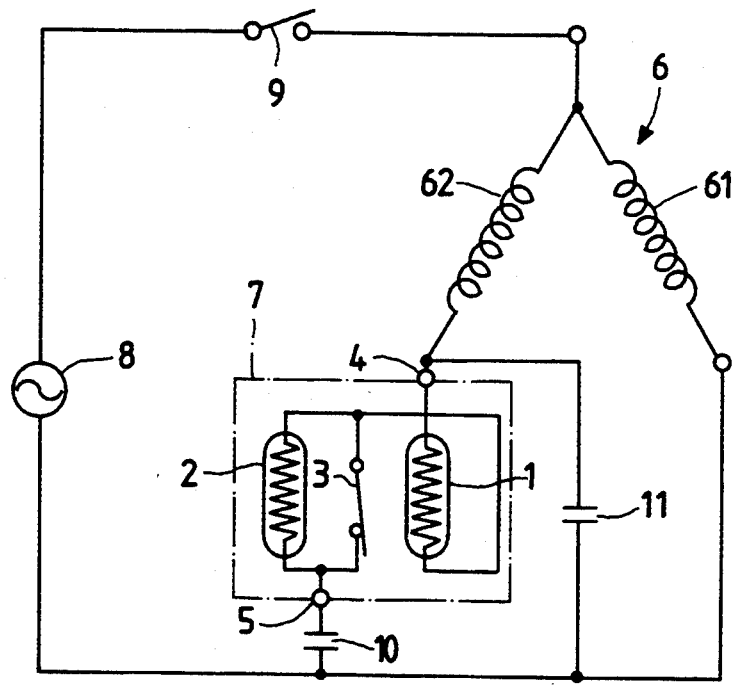
Figure 10:
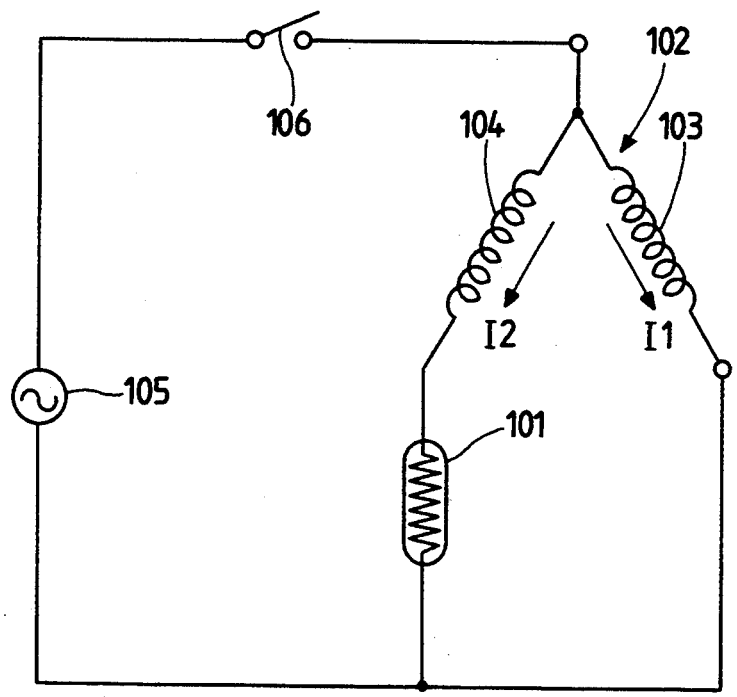
FIG. 10 is a circuit diagram showing a conventional motor starting circuits with a PTC relay device.

FIGS. 7 through 9 show motor starting circuits, in which parts corresponding functionally to those which have been described with reference to FIG. 5 are therefore designated by the same reference numerals. Each of the motor starting circuits employs the relay device according to the invention. In those figures, reference numerals 10 and 11 designate starting capacitors.

The relay device of the invention has the following effects or merits:

As was described above, in the relay device, one end of the first PTC thermistor is connected to the first external connecting terminal, and the other end is connected to one end of the second PTC thermistor, the other end of which is connected to the second external connecting terminal, and the thermo-switch is connected in parallel with the second PTC thermistor, and is held closed when not heated. Hence, the initial resistance of the relay device depends on the first PTC thermistor. Therefore, in the relay device of the invention, the cold resistance of the first PTC thermistor is set to a low value. That is, in the relay device according to the invention, the initial resistance is low due to the cold resistance of the first PTC thermistor set.

The thermo-switch is thermally coupled to the first and second PTC thermistors, and connected in parallel to the second PTC thermistor. The switch is held closed when not heated, and is opened by the heat generated by the first or second PTC thermistor. Hence, in the relay device of the invention, the initial resistance is small which is provided for an initial period of time immediately after the power switch is turned on, and the power consumption during heat balance is small.

The thermo-switch is thermally coupled to the second PTC thermistor, and is opened by the heat generated by the latter. Hence, in the relay device of the invention, the thermo-switch which has been opened by the heat generated by the first PTC thermistor is stably maintained opened mainly by the heat generated by the second PTC thermistor.

While there has been described inventions in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A relay device for starting an electric motor, comprising:
   a first PTC thermistor, a first end of which is connected to a first external connecting terminal;
   a second PTC thermistor, a first end of which is connected to a second external connecting terminal and a second end of which is connected to a second end of said first PTC thermistor; and
   a thermo-switch being thermally coupled to said first and second PTC thermistors, and connected in parallel with said second PTC thermistor, said thermo-switch being closed when not heated, and being opened by heat generated by said first or second PTC thermistor.

2. A relay device as claimed in claim 1, further comprising a common electrode disposed between said first and second PTC thermistors said common electrode being connected with said thermo-switch, whereby said first and second PTC thermistors, said common electrode, and said thermo-switch are thermally coupled.

3. A relay device as claimed in claim 1, wherein said thermo-switch is opened by heat generated by said first PTC thermistor, and is thereafter maintained opened mainly by heat generated by said second PTC thermistor.

4. A relay device as claimed in claim 1, wherein the power consumption of said second PTC thermistor is lower than that of said first PTC thermistor when said thermal-switch is open.

5. A relay device as claimed in claim 1, wherein the sum of the power consumptions of said first and second PTC thermistors with said thermo-switch held opened is smaller than the power consumption of said first PTC thermistor with said thermo-switch held closed.

6. A relay device as claimed in claim 1, wherein said second PTC thermistor is higher in resistance than said first PTC thermistor when said first and second PTC thermistors are at one and the same temperature.

7. A relay device as claimed in claim 1, wherein said second PTC thermistor is lower in Curie point than said first PTC thermistor.

8. A relay device as claimed in claim 1, wherein said second PTC thermistor is smaller in volume than said first PTC thermistor.

9. A relay device as claimed in claim 1, wherein said thermo-switch has a heat-operation piece, which is provided on a side of said first PTC thermistor.

10. A relay device for starting an electric motor comprising:
    a first PTC thermistor having a first terminal connected to an input terminal and having a second terminal, said first PTC thermistor having a first resistance;
    a second PTC thermistor having a first terminal connected to the second terminal of the first PTC thermistor and having a second terminal connected to an output terminal, said second PTC thermistor having a second resistance being higher than said first resistance;
    a thermo-switch being thermally coupled to said first and second PTC thermistors, and having a first terminal connected to the first terminal of the second PTC thermistor and having a second terminal connected to the output terminal; and
    said thermo-switch being closed during an initial start-up period of the electric motor for short-circuiting the second PTC thermistor and allowing current to flow through the first resistance of the first PTC thermistor with low resistance, and said thermo-switch being opened by heat generated in said first PTC thermistor during a steady-state of said electric motor for connecting the first PTC thermistor in series with the second PTC thermistor and reducing the current through the first PTC thermistor and reducing power consumed during a steady-state of the electric motor.

11. The relay device according to claim 10, wherein the electric motor comprises:
    a single phase motor having a main winding and an auxiliary winding;
    said main winding having a first terminal connected to a power input and a second terminal connected to the output terminal of the relay device; and
    said auxiliary winding having a first terminal connected to the power input terminal and a second terminal connected to the input terminal of the relay device.

12. The relay device according to claim 10, wherein:
    said first and second PTC thermistors each have an initial resistance in the range of 3.3 ohms to 22 ohms and each have a diameter in the range of 14 mm to 20 mm, resulting in power consumption of the electric motor in a range of 1.9 to 2.0 watts during a steady-state.

* * * * *